United States Patent Office 3,409,692
Patented Nov. 5, 1968

3,409,692
PROCESS OF SEPARATING LIGANDS BY COMPLEXATION WITH SOLID ADSORBENTS OF GROUP I-B METAL SALTS
Robert B. Long, Atlantic Highlands, N.J., and Donald L. Baeder, Baytown, Tex., assignors to Esso Research and Engineering Company, a corporation of Delaware
No Drawing. Filed Sept. 7, 1965, Ser. No. 485,574
14 Claims. (Cl. 260—677)

ABSTRACT OF THE DISCLOSURE

Process for separating and recovering complexible ligands having heats of complexation no more than 8.0 kilocalories apart which comprises sequential displacement-complexation in a heat balanced process where the heat of complexation of the displacing ligand supplies the sorption heat for the displaced ligand.

---

The present invention is directed to an improved process for selectively separating and recovering compounds capable of complexing with sorption-active, porous, particulate solid salts of Group I-B metals, viz, Cu (1), Ag (1), and Au (1), from hydrocarbons or other mixtures containing them.

More specifically, this invention is directed to a highly efficient process for separating and recovering an unsaturated Group I-B metal-complexable aliphatic hydrocarbon (ligand) from hydrocarbon mixtures containing it by contacting said mixture(s) with a sorption-active, porous, particulate, solid Group I-B metal salt either in the vapor or liquid phase at temperatures and pressures sufficient for complex formation between said salt and said ligand, and then displacing said ligand from said formed complex by contacting said previously formed complex with a displacing ligand having an equivalent heat of complexation with said metal salt, viz, having a heat of complexation of not more than 8.0 (and usually not more than 5.0) kilocalories per mole from that of said previously complexed (sorbed) ligand, for a sufficient period to displace said previously sorbed ligand thereby desorbing the previously sorbed ligand in a purer state (more highly concentrated with respect to its original impurities) than it was when present in said hydrocarbon mixture.

One of the major problems in the selective separation and recovery of unsaturated compounds by chemical sorption (complexing) with Group I-B metal salt sorbents is the high heat of reaction which must be either supplied (during decomplexation) or removed (during complexation). This heat usually lies within the range of about 8 to 20 kilocalories per mole of unsaturated material reacted.

This problem is substantially overcome and alleviated by the present invention because the complexation of the displacing ligand provides the heat of decomplexation for the decomplexation (desorption) of the displaced ligand because the complexation reaction is exothermic whereas the decomplexation is endothermic. According to a preferred embodiment of this invention, the displaced ligand has a boiling point different from that of the displacing ligand in order to facilitate separation of the displaced from the displacing ligands (subsequent to the ligand replacement step) by fractional distillation or other simple and economical separation procedures. Thus, according to this preferred embodiment of the present invention, the differential (Δ) between the boiling points of the displaced ligand and the displacing ligand is at least 10° F., and more preferably at least about 30° F.

The sorption-active porous, particulate, solid Cu (1), Ag (1), and Au (1) salts can be prepared conveniently in accordance with the activation procedures outlined in U.S. patent application Ser. No. 333,925 of Robert B. Long and Warren A. Knarr, Ser. No. 333,926 of Robert B. Long (both filed Dec. 27, 1963) or Ser. No. 452,576 of Robert B. Long (filed May 3, 1965), and the disclosure of said applications is incorporated herein by reference. Characteristically, these sorption-active, porous Group I-B metal salts have a porosity of above about 10% (of the total volume of a particle) 550 to 10,000 A. pores. An exemplary procedure is given hereinbelow for preparation of sorption-active porous Cu (1) salts, but it should be understood that essentially the same procedure can be employed in preparation of the Ag (1) and Au (1) salts also.

A suitable raw cuprous salt, e.g., a cuprous halide such as commercial cuprous chloride (which is comparable to an inactive cuprous salt for sorption purposes) can be converted readily into a sorption-active cuprous salt by essentially a 3-stage procedure. Initially, the cuprous salt is dissolved at suitable temperatures, e.g., −40 to 50° F., in an aqueous or organic solvent, such as a monoolefinic hydrocarbon solvent, e.g., butene-1, isobutylene, pentene-1, hexene-1, or other suitable $C_4$ to $C_{12}$ monoolefins, or mixtures thereof. The resulting cuprous halide solution is then clarified using a suitable filter, centrifuge, etc., to remove undissolved cuprous halide salts and other insolubles therefrom. The thus clarified solution is then contacted at suitable complexing temperatures, viz, temperatures of −40 to about 50° F., with a complexing agent capable of forming a stable copper-complexing agent complex having a mole ratio of copper to complexing compound greater than 1:1. Preferably, a complexing agent is employed which forms a stable complex having a mole ratio of copper to complexing agent (ligand) of 2:1 and higher. The purpose of this complexation is to impart the requisite porosity and resulting sorption activity to said cuprous halide salt upon decomplexation of said complex. Thus, from this point of view, the above-mentioned complexing agents capable of forming a stable copper complex having a mole ratio of copper to complexing agent of greater than 1:1 can be considered as "conditioning" ligands (complexing agents) in that they condition the cuprous salt and render it sorption-active.

The contact of the clarified cuprous halide solution with the suitable complexing agent is conducted for a sufficient time period to enable complexation of substantially all of the dissolved cuprous halide. Subsequent to the complex formation, the cuprous halide-conditioning ligand complex is then subjected to conditions of temperature and pressure such that the dissociation pressure of the complex exceeds the partial pressure of the complexed ligand. Consequently, the cuprous halide-conditioning ligand complex decomposes with release of the "conditioning" ligand which can be recovered by conventional means.

Suitable complexing agents ("conditioning" ligands) which can be employed to impart the sorption-activity to the cuprous halide salts include both materials which form only complexes having said ratios of copper to complexing compounds greater than 1:1 and compounds which form complexes having a ratio of 1:1 or less, which upon decomplexing (desorption) pass through a stable complex having a ratio of copper to complexing compound greater than 1:1. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissocation, complexing material is released selectively from the bed of cuprous halide until the stable complex, viz., the complex having a copper to complexing agent ratio above 1:1, e.g., 2:1 stoichiometric complex, is completely formed before further decomplexing to the uncomplexed (active) cuprous halide salt. In this specification by "stable complex" is meant a stoichiometric complex stable upon dissociation as described in the preceding sentence. Such "conditioning" agents (ligands) as contemplated herein are carbon monoxide, organic nitriles, organic compounds having an acetylenic group, i.e., as present in acetylene, $C_3$ to $C_{20}$ polyolefins, e.g., allene, and especially $C_4$ to $C_{10}$ conjugated diolefins, e.g., butadiene, isoprene, etc. More than one of these functional groups can be present in the single molecule of the complexing compound. In addition, the complexing compounds can contain other functional (complexable) groups so long as these groups do not interfere with complex formation. The preferred "conditioning" ligand is butadiene due to its ability to impart high sorptive capacity to the cuprous halide salts.

The decomplexation of the cuprous chloride-"conditioning" ligand complex can be conducted at a wide variety of temperature and pressure conditions as only the above complex dissocation criteria need be observed. Suitable temperature and pressure conditions for desorption of the cuprous chloride-conditioning ligand complex (e.g., where the conditioning ligand is butadiene) can range from about 100 to 220° F., and more preferably from about 140 to about 190° F., at pressures ranging from 1.5 to 150 p.s.i.a. and more preferably from about 15 to 75 p.s.i.a., respectively. Procedurally speaking, the drying and decomplexing are usually accomplished in the following manner. The complex, as a wet cake from a filter or other suitable separating device, is collected in a suitable vessel. Stripping gas is admitted to the bottom of the vessel. Heat is applied to the vessel and/or the stripping gas, which promotes drying of the complex. As the free liquid solvent is removed, the granular complex loses its cake form and the discrete particles readily fluidize. Decomplexing to form the sorption-active cuprous halide salt is then accomplished by heating as noted above. Typical decomplexation conditions for decomplexing cuprous halide-butadiene complexes are 0.3 ft./sec. superficial vessel stripping gas velocity and temperatures of 140–190° F. at atmospheric pressure.

As mentioned above, the activated cuprous halide sorbent particles used according to this invention characteristically possess porosities of above about 10% and usually of 25+% (of the total volume of a particle) being 550 to 10,000 A. pores, as determined by mercury porosimeter measurement. The bulk density of these active cuprous chloride sorbent particles characteristically ranges from about 60 to 90 lbs./cu. ft. loose) and about 65 to about 97 lbs./cu. ft. (compacted). The average particle size diameter of these active cuprous chloride sorbents characteristically ranges from about 50 to about 100+ microns.

While the foregoing discussion illustrates a suitable procedure for preparing sorption-active cuprous chloride particles suitable for use in accordance with this invention, it should be understood that the procedure described hereinabove is likewise applicable to other cuprous halide salts (other than cuprous chloride) and other Group I–B metal salts, viz., the salts of silver and gold.

Suitable sorption-active copper salts which can be employed include, but are not limited to, the following: cuprous chloride, cuprous bromide, cuprous iodide, cuprous nitrate, etc. Suitable silver salts include, but are not limited to, the following: silver perchlorate, silver fluoborate, silver nitrate, silver hexafluoroantimonate, silver bromide, etc. Suitable gold salts which can be employed include, but are not limited to, the following: AuCl, AuBr, and AuI. While the above Cu (I), Ag (I), and Au (I) salts have been cited as exemplary of those which can be activated in accordance with this invention, it should be understood that other suitable Cu (I), Ag (I), and Au (I) sorption-active salts can be employed.

The present invention is capable of conducting highly efficient (heat exchange balanced) recovery and separation of a wide variety of complexable compounds from mixtures containing them. For example, ethylene can be readily sorbed (complexed) from a gaseous stream containing it by passing it through a fixed or fluidized bed of sorption-active cuprous chloride, cuprous bromide, or silver nitrate salt. When the bed is essentially saturated with ethylene, the feed stream (ethylene-containing hydrocarbon mixture) is shut off, and a brief purge can be used to remove the void gas. Subsequent to this, a narrow cut butadiene-containing $C_4$ stream (containing from 5 to 50 wt. percent butadiene) can be fed as a gas to the sorption-active salt particles complexed previously with ethylene. Control of temperature and pressure can be used to insure gaseous operation with the fluid bed. This butadiene-containing $C_4$ stream reduces the ethylene partial pressure to below the dissociation pressure of the sorption-active ethylene complex, thereby releasing ethylene from the complex in a much purer form than it was present in the ethylene-containing hydrocarbon feed stream subjected to ethylene removal. At the same time, the butadiene present in the butadiene-containing ligand displacing stream forms a complex with the sorption-active Cu (1), Ag (1), or Au (1) salt, thus providing the heat needed to dissociate the previously formed ethylene complex with the same above mentioned salt(s). The pure ethylene is then recovered from the tail gas by distillation of the $C_4$ stream to separate ethylene from butadiene. Of course, pure butadiene can be used. Then, after the sorption-active salt bed becomes essentially saturated with butadiene, the $C_4$ butadiene-containing stream can be shut off, and the ethylene feed stream can then be fed through the bed once more. At this stage of the process, the butadiene is similarly dissociated from the sorption-active Group I–B metal salts (with which it has previously complexed to dissociate the ethylene), thereby resulting in the release of essentially pure butadiene from the sorption-active Group I–B salt and formation of the ethylene complex thereof. Such cyclic operation can then be continued to alternately obtain highly pure ethylene and highly pure butadiene from respectively different ethylene and butadiene-containing hydrocarbon streams.

Of course, the present invention is by no means limited to employment of ethylene and butadiene as the displacing and/or displaced ligands. For example, in addition to ethylene and butadiene, the following pairs of ligands can be employed in separating and recovering ligands from ligand-containing streams in a higher purity than that in which they were present in their respective feed stream mixtures: (the preferred Group I–B salt being indicated in parenthesis) ethylene-isobutylene (active cuprous chloride sorbent); ethylene-butene-1 (active cuprous chloride sorbent); butadiene-piperylene (active cuprous chloride sorbent); butadiene-allene (active cuprous chloride sorbent); ethylene-propylene (active cuprous chloride sorbent); acetylene-allene (active cuprous chloride sorbent); acetylene-1-butyne (active cuprous chloride sorbent); ethylene-butadiene (active silver nitrate sorbent); ethylene-cis-2-butene (active silver nitrate sorbent); etc.

Thus the present invention is useful in separating: monoolefins from diolefins, monoolefins from one another, diolefins from one another, diolefins from acetylenes, monoolefins from acetylenes, monoolefins from diolefins and acetylenes, etc. Other pairs of displacing and/or displaced ligand purification procedures will become obvious in view of the present invention from dissociation pressure data known with respect to various complexable ligands having the requisite properties mentioned hereinabove for separation and recovery in accordance with this invention, viz., ligands having equivalent heats of complexation with said sorption-active Group I–B metal salts, viz., those ligands having heats of complexation not more than 8.0 kilocalories per mole from that of the previously complexed (sorbed) ligands coupled with the ability to be readily separated therefrom, e.g., by fractional distillation. Usually it is desirable for the pairs of complexable ligands to possess equivalent heats of complexation (Hc) within less than about 5 kilocalories per hole of one another, e.g., a ($\Delta$Hc) ranging from 0.1 to 4.0 kilocalories per mole. Preferably, pairs of ligands are employed as the displacing and displaced ligands which have equivalent heats of complexing of within 2 kilocalories per mole, e.g., 0.0 to 2.0 kilocalories per mole, of one another coupled with a boiling point differential of at least 10° F. from one another to allow for easy separation thereof by simple fractional distillation procedures.

As mentioned previously, liquid phase sorption can be conducted using liquid ligands. When the sorption is conducted in the liquid phase in accordance with this invention, some or even a substantial portion (50 wt. percent or even higher) of the Group I–B salt sorbent can be raw salt, which is comparatively sorption-inactive. In liquid phase sorption, the liquid ligand is usually contacted with less than the stoichiometric amount, e.g., from 50 to 95% of the stoichiometric amount, of Group I–B sorption-active metal salt for a time sufficient to form a complex with the ligand having lower dissociation pressure. The driving force is greater for said ligand and it is sorbed more selectively (from mixtures containing it).

When the sorption is conducted in the vapor phase it is usually conducted at temperatures within about 20° F. of the dew point of the gaseous ligand being sorbed and more preferably within about 10° F. of said dew point.

The present invention will be illustrated in further detail by the examples which follow.

Example 1.—Ligand exchange between 1,3-butadiene and 1,3-pentadiene over CuCl 467 grams of the granular 2CuCl:1 butadiene-1,3 complex prepared by crystallization from a conc. HCl solution of CuCl was placed in a stainless steel Waring Blendor which had been equipped with four stirring paddles on the central shaft. A piperylene (1,3-pentadiene) stream containing 12.0% cyclopentene diluted with $N_2$ was fed into the bottom of the stirred reactor at room temperature. The $C_5$ stream was picked up in the $N_2$ by bubbling the $N_2$ through a container of $C_5$ held at about room temperature (24° C.). The gaseous product from the top of the enclosed Blendor was collected in a Dry Ice trap and analyzed by gas chromatography. After 580 g. of $C_5$ had been passed through the Blendor, the gas feed was changed and 950 g. of pure 1,3-butadiene was fed to the Blendor bottom (still at room temperature) and the tail gas was fed directly to the sampling valve of a gas chromatograph and analyzed.

ANALYTICAL RESULTS ON TAIL GAS SAMPLES

| Sample | Composition, Mole percent | | |
|---|---|---|---|
| | Piperylene | Cyclopentene | Butadiene |
| C₅ feed | 88.0 | 12.0 | 0.0 |
| First product from C₅ feed | 75.1 | 12.3 | 12.5 |
| Last product from C₅ feed | 85.2 | 13.7 | 1.1 |
| First product from C₄⁻⁻feed | 29.1 | 0.0 | 70.9 |
| Second Product from C₄⁻⁻feed | 2.8 | 0.0 | 97.2 |

These data show that under isothermal conditions, the piperylene stream was able to displace butadiene from the original complex and that cyclopentene was not being absorbed but piperylene only was exchanging for butadiene. Furthermore, when butadiene was fed to the reactor (Blendor), the piperylene was desorbed and contained no cyclopentene. Thus, merely by distilling the butadiene from the piperylene product, the piperylene purity would approach 100%. This high purity would also be obtained for butadiene by distillation of the butadiene product stream obtained by displacement with the piperylene stream. The data also show that butadiene at 1 atmosphere is 3 times as effective for ligand exchange as piperylene at 0.3 atmosphere. Thus the two ligands are about equivalent.

Example 2.—Ligand exchange between 1,3-butadiene and 1,2-propadiene over CuCl

The same charge of solids from the finish of Example 1 was fed with a stream of pure 1,2-propadiene (allene) at the bottom until 313 g. were passed through the Blendor. The tail gas was monitored by gas chromatography for composition. Then pure butadiene was substituted for allene until 570 g. had been fed to the bottom of the Blendor. Again the tail gas was monitored by gas chromatography.

ANALYTICAL RESULTS ON TAIL GAS SAMPLES

| Sample | Composition, mole percent | |
|---|---|---|
| | 1,3-butadiene | Allene |
| Product: | | |
| No. 1 From Allene Feed | 8.7 | 91.3 |
| No. 2 | 9.2 | 90.8 |
| No. 3 | 14.0 | 86.0 |
| No. 4 | 1.8 | 98.2 |
| No. 5 | 12.3 | 87.7 |
| No. 6 | 9.1 | 90.8 |
| No. 7 | 9.1 | 90.9 |
| Product: | | |
| No. 1 From C₄⁻⁻feed | 68.6 | 31.4 |
| No. 2 | 95.5 | 4.5 |
| No. 3 | 90.8 | 9.2 |
| No. 4 | 99.7 | 0.3 |
| No. 6 | 99.9 | 0.1 |

These data show that exchange of allene and butadiene also occurs readily and that butadiene is somewhat more effective than allene for the exchange. This is in line with the greater stability of the CuCl complex of butadiene.

Example 3.—Ligand exchange between butadiene and ethylene over CuCl

A 75-gram sample of active CuCl prepared by disassociation of the butadiene-CuCl complex is mixed with an equal weight of 20–40 micron glass beads ("Scotchlite") and placed in a 1-inch diameter jacketed glass fluid bed reactor. The bed of CuCl-Scotchlite is cooled to −30° C. while being fluidized with nitrogen at 1 atmosphere pressure. Then a 50:50 ethylene-ethane mixture is substituted for nitrogen at 0.31 ft./sec. superficial velocity and the ethylene is selectively complexed with the CuCl. When the complexing of ethylene is finished, as evidenced by no further heat release from the complexing step (normally 10.0 kcal./g. mole of ethylene or CuCl) the $C_2$ feed is discontinued, and the bed is purged with a brief feed of nitrogen and warmed to 0° C. Then crude butadiene (containing 30% butadiene, 60% butene-1 plus isobutylene, with the rest other butenes and butanes) is fed to the bottom of the fluid bed at atmospheric pressure and 0.3 ft./sec. superficial velocity. The butadiene complexes with the CuCl displacing the ethylene and giving very slight temperature change in the CuCl bed. Butadiene has a heat of complexing of 17.0 kcal./gram mole of butadiene or 8.5 kcal./g. mole of CuCl. Thus, only 10–8.5 or 1.5 kcal./mole of CuCl need be provided to decomplex the ethylene. This is readily provided by the sensible heat of the $C_4$ stream with only slight cooling of the CuCl bed. The product gas from the $C_4$ feed contains only 1–2% butadiene, 75% ethylene, no ethane, and the rest butenes and butanes. Simply by distillation, pure ethylene can be obtained from this fraction.

The bed is again purged with nitrogen (after the $C_2$-desorption is complete) to remove residual $C_4$'s from the unit and the butadiene can be recovered either by returning to the ethylene-ethane feed at −30° C. in which case the tail gas contains only 0.1% butadiene and desorption is excessively long, or by heating to about 80° C. at 1 atmosphere. The product butadiene is greater than 99% pure with the major impurities being isobutylene and butene-1.

This example illustrates the essentially isothermal replacement of ethylene from the CuCl complex by the butadiene ligand while permitting purification of both ethylene and butadiene from their mixtures with other hydrocarbons by a combination of complexing ligand exchange and distillation.

Example 4.—Ligand exchange between ethylene and cis-2-butene over AgNO₃

150 grams of active AgNo₃ prepared by vacuum dissociation of the 1,3-butadiene:2AgNO₃ complex (prepared according to the method of Ser. No. 452,576 referred to hereinabove) at room temperature is placed in the same small fluid bed reactor used in Example 3. A 50:50 mixture of butane and cis-2-butene at 1 atmosphere and —10° C. is fed to the bottom of the fluid bed at 0.3 ft./sec. superficial velocity. The cis-2-butene complexes readily with AgNO₃ and gives off about 11.5 kcal./mole of hydrocarbon. This heat is absorbed by coolant circulated at —10° C. in the jacket of the fluid bed.

After the AgNO₃ has absorbed all the cis-2-butene it can, the bed is purged briefly at 10° C. with nitrogen and a 50:50 ethane-ethylene stream is then fed to the fluid bed. The cis-2-butene is displaced by ethylene which has a heat of complexing of 10.0 kcal./mole of ethylene. Thus, the net heat of reaction is only 11.5–10.0 or 1.5 kcal./g. mole of hydrocarbon exchanged. The composition of the tail gas during this exchange is:

The composition of the tail gas during this exchange is:

| Component: | Vol. percent |
|---|---|
| Ethylene | 15 |
| Ethane | 55 |
| Cis-2-butene | 30 |
| Butene | 0.0 |

After the cis-2-butene has been removed from the complex, the bed is again briefly purged with N₂ and the 50:50 cis-2-butene-butane mixture is again fed to the fluid bed. The tail gas from this ligand exchange has the composition:

| Component: | Vol. percent |
|---|---|
| Ethylene | 15 |
| Ethane | 0.0 |
| Cis-2-butene | 30 |
| Butane | 0.0 |

Then pure ethylene and pure cis-2-butene are recovered from the ligand exchange products conveniently by distillation. By operating at lower temperatures or higher pressures, the yield of the unsaturates is increased. However, the lower unsaturate concentrations in the tail gas under such circumstances require larger distillation towers. Furthermore, if it is desirable to have higher ethylene concentrations on desorbing ethylene, a more stable ligand (e.g., butadiene) can be used in the desorption step. Conversely if cis-2-butene is to be emphasized, cis-piperylene can be used in the butene desorption step.

Example 5.—Exchange of ethylene and butadiene over gold iodide

A run similar to Example 3 is carried out using activated AuI (plus an equal weight of "Scotchlite" glass beads) prepared by dissociation of the butadiene complex. A 50:50 ethylene-ethane mixture is first contacted with the fluid bed of AuI at —30° C. and 1 atmosphere and then after a brief nitrogen purge and warming to 0° C., crude butadiene is fed to desorb the ethylene by ligand exchange with ethylene. As in Example III the tail gas is predominantly ethylene and butenes with only a small amount, 1–2%, of butadiene. As before, the butadiene can be recovered in high purity from the complex by heating after N₂ purge, and the ethylene can be recovered from the C₄'s by distillation.

While all of the above examples illustrate vapor phase operation, as noted hereinabove, the same procedures apply to reactions of solid Cu, Ag, or Au salts with liquid complexing agents in conducting liquid phase ligand exchange.

What is claimed is:
1. A substantially heat-balanced process for separating and recovering an unsaturated aliphatic hydrocarbon compound (ligand) capable of complexing with sorption-active, porous, particulate solid salts of Group I–B metals from a feedstream mixture containing it which comprises
  (a) contacting said mixture with Group I–B sorption-active, porous, salt particles having a porosity of above about 10% (of the total volume of a particle) 550 to 10,000 A. pores at temperature and pressure conditions sufficient to form a complex of said complexable ligand with said sorption-active Group I–B metal salt, and then
  (b) contacting said complex with a displacing unsaturated aliphatic hydrocarbon ligand also capable of complexing with said sorption-active salt and having an equivalent heat of complexation (HC) therewith as characterized by a ΔHC of not more than about 8.0 kilocalories per mole between said displaced ligand and said displacing ligand to dissociate said complex and form a new complex with said displacing ligand thereby desorbing the previously complexed ligand and releasing it in a purer state than that in which it was present in said feedstream mixture, said process being further characterized in that the heat of complexation emanated from the formation of said new complex with said displacing ligand provides at least a substantial portion of the heat for thermal dissociation of said previous complex.

2. A process as in claim 1 wherein said contacts in (a) and (b) occur with the respective ligands in vapor phase at temperatures within about 20° F. of the dew points of said gaseous displaced and displacing ligands, respectively.

3. A process as in claim 1 wherein said contacts in (a) and (b) occur with the respective ligands in liquid phase employing less than the stoichiometric amount of said Group I–B metal salt.

4. A process as in claim 1 wherein said sorption-active Group I–B metal salt is a cuprous salt.

5. A process as in claim 1 wherein said sorption-active Group I–B metal salt is a silver salt.

6. A process as in claim 1 wherein said sorption-active Group I–B metal salt is a gold salt.

7. A process as in claim 4 wherein said cuprous salt is a cuprous halide.

8. A process as in claim 7 wherein said cuprous halide is cuprous chloride.

9. A process as in claim 1 wherein one of said ligands is a monoolefin.

10. A process as in claim 1 wherein one of said ligands is a multiolefin.

11. A process as in claim 10 wherein said multiolefin is a diolefin.

12. A process as in claim 1 wherein one of said ligands is a compound containing an acetylene group.

13. A process as in claim 9 wherein said monoolefin is ethylene.

14. A process as in claim 11 wherein said diolefin is butadiene.

References Cited

UNITED STATES PATENTS

| | | | |
|---|---|---|---|
| 2,077,041 | 4/1937 | Davis et al. | 260—170 |
| 3,070,642 | 12/1962 | Krous et al. | 260—681.5 |
| 3,130,243 | 4/1964 | Dunn et al. | 260—677 |
| 3,352,936 | 11/1967 | Slott | 260—677 |

DELBERT E. GANTZ, *Primary Examiner.*

J. D. MYERS, *Assistant Examiner.*